(12) United States Patent
Rath et al.

(10) Patent No.: US 9,531,633 B2
(45) Date of Patent: Dec. 27, 2016

(54) CONTROL PLANE OPTIMIZATION OF COMMUNICATION NETWORKS

(71) Applicant: TATA Consultancy Services Limited, Mumbai (IN)

(72) Inventors: Hemant Kumar Rath, Whitefield (IN); Vishvesh Revoori, Whitefield (IN); Shameemraj Mohinuddin Nadaf, Whitefield (IN); Anantha Simha, Whitefield (IN)

(73) Assignee: TATA Consultancy Services Limited, Mumbai (IN)

( * ) Notice: Subject to any disclaimer, the term of this patent is extended or adjusted under 35 U.S.C. 154(b) by 90 days.

(21) Appl. No.: 14/663,184

(22) Filed: Mar. 19, 2015

(65) Prior Publication Data

US 2015/0271078 A1    Sep. 24, 2015

(30) Foreign Application Priority Data

Mar. 20, 2014    (IN) ............................ 921/MUM/2014

(51) Int. Cl.
*H04L 12/801* (2013.01)
*H04L 12/715* (2013.01)
(Continued)

(52) U.S. Cl.
CPC ............ *H04L 47/193* (2013.01); *H04L 45/64* (2013.01); *H04L 45/125* (2013.01); *H04L 45/42* (2013.01); *H04L 47/122* (2013.01); *H04L 47/125* (2013.01)

(58) Field of Classification Search
CPC .... H04L 12/715; H04L 12/717; H04L 12/801; H04L 12/803; H04L 41/0893; H04L 41/12; H04L 45/42; H04L 45/64; H04L 45/125; H04L 47/19; H04L 47/122; H04L 47/125; H04L 47/193
See application file for complete search history.

(56) References Cited

U.S. PATENT DOCUMENTS 5,031,089 A    7/1991   Liu et al.
6,335,926 B1   1/2002   Silton et al.
(Continued)

FOREIGN PATENT DOCUMENTS

CN    1897549    1/2007

OTHER PUBLICATIONS

Bari, MD. Faizul, et al., "Dynamic Controller Provisioning in Software Defined Networks", David R. Cheriton School of Computer Science, University of Waterloo, Oct. 2013, 8 pgs.
(Continued)

*Primary Examiner* — Tri H Phan
(74) *Attorney, Agent, or Firm* — Schwegman Lundberg & Woessner, P.A.

(57) ABSTRACT

Optimization of control plane in a software defined network includes obtaining peer information of at least one neighbouring network controller by a network controller and determining a traffic profile variation. The method further includes computing of a self payoff value indicative of one of optimum utilization, underutilization and overutilization of the network controller. The method further includes initiating a non-zero sum game based network control plane optimization operation based on the self payoff value and the traffic profile of the neighbouring network controllers, and may include one of activating additional network controller(s), transferring control of one or more network devices managed by the network controller(s) to a neighbouring greedy network controller, deactivating the network controller, and transferring control of one or more additional
(Continued)

network devices managed by the neighbouring network controller(s) to the greedy network controller.

15 Claims, 10 Drawing Sheets

(51) Int. Cl.
*H04L 12/803* (2013.01)
*H04L 12/729* (2013.01)
*H04L 12/717* (2013.01)

(56) References Cited

U.S. PATENT DOCUMENTS

| | | | |
|---|---|---|---|
| 6,438,100 B1 | 8/2002 | Halpern et al. | |
| 6,944,131 B2 * | 9/2005 | Beshai | H04L 45/02 370/220 |
| 8,582,470 B2 * | 11/2013 | Collins | H04L 41/042 370/254 |
| 9,077,655 B2 * | 7/2015 | Babiarz | H04L 43/0876 |
| 2006/0165017 A1 * | 7/2006 | Blasco Claret | H04L 12/44 370/256 |
| 2013/0250770 A1 | 9/2013 | Zou et al. | |
| 2014/0204794 A1 * | 7/2014 | El-Najjar | H04W 16/18 370/254 |
| 2014/0223007 A1 * | 8/2014 | Jorgenson | H04L 41/12 709/224 |
| 2014/0355435 A1 * | 12/2014 | Umezuki | H04L 47/125 370/231 |

OTHER PUBLICATIONS

Dixit, Advait, et al., "Towards an Elastic Distributed SDN Controller", Purdue University, Bell Labs Alcatel-Lucent, HotSDN'13, Aug. 16, 2013, Hong Kong, China, (Aug. 16, 2013), 6 pgs.

* cited by examiner

CONTROL PLANE OPTIMIZATION OF COMMUNICATION NETWORKS

CLAIM OF PRIORITY

This application claims the benefit of priority of Indian Patent Application Serial No. 921/MUM/2014, filed on Mar. 20, 2014, the benefit of priority of which is claimed hereby, and which is incorporated by reference herein in its entirety.

TECHNICAL FIELD

The present subject matter relates, in general, to communication networks and, in particular, to optimization of control plane in Software Defined Network (SDN).

BACKGROUND

Communication networks are vastly utilized and relied upon across the globe to share information between two or more end users. A communication network, also referred to as a network, typically involves one or more network devices, such as network switches and network routers, apart from other components, for the purpose of transferring information amongst the end users.

The information is transferred in the form of digitized data packets, simply referred to as packets. At a network device, packets are received at one or more input ports of and are forwarded to one or more output ports of the network device. The forwarding is based on a path or a route of the packet, for being forwarded to an end user, which may in turn be based on the configuration of the network. Typically, each forwarder in a network is configured with an in-built control logic, also referred to as the control plane. The control plane determines forwarding rules or conditions that allow the network device to control the forwarding behaviour or flow of packets between the input and output port(s) of the network device.

More recently, computer networks with dynamic architectures, such as Software Defined Networks (SDNs) that allow the control logic to be decoupled from the network device and be moved to external central controllers are increasingly being used. The SDN architecture decouples the control plane of the network from the data plane and provides direct control of the network devices such that the network may be managed with greater flexibility and efficiency.

BRIEF DESCRIPTION OF DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which:

FIG. 5($b$) illustrates an SDN topology implementing the non-zero sum game based network control plane optimization operation for a decreasing network load, according to an implementation of the present subject matter.

FIG. 6($b$) illustrates an SDN topology implementing the non-zero sum game based network control plane optimization operation for an increasing network load, according to an implementation of the present subject matter.

FIG. 7($b$) illustrates an SDN topology implementing the non-zero sum game based network control plane optimization operation for a change in network load, according to an implementation of the present subject matter.

Figure 1:
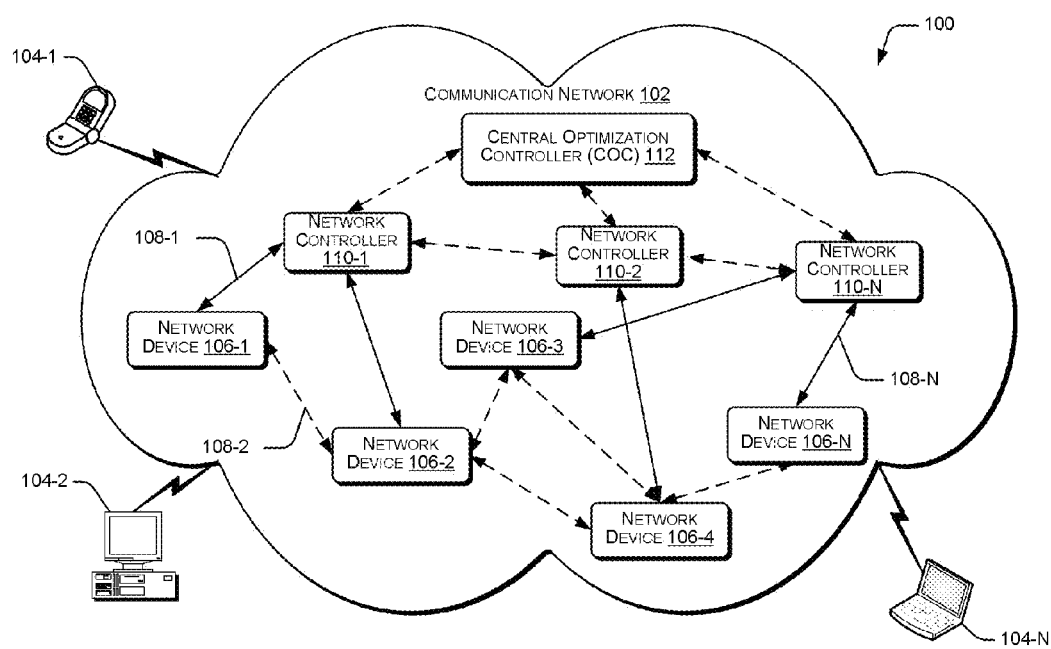
FIG. 1 illustrates a network environment implementing a system for network control plane optimization in software defined network (SDN), according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Software Defined Network (SDN) technology provides customization and optimization of data forwarding in communication networks. Modern communication networks are simplified by the SDN technology by decoupling a data-forwarding layer and control layer, for example, the data plane and the control plane. In conventional communication networks, the control plane function, such as routing, resourcing, and management functionality are performed in the network devices, such as a switch or a router itself, whereas, in case of communication networks supporting SDN, the network devices are configured to implement the data plane functions, while the control plane functions are provided by an SDN controller mapped to the network devices. Open Application Programming Interface (API) services, such as Open Flow protocol are implemented to manage the interactions between the data plane and control plane. SDN in conjunction with an Open API service provides flexibility and increased control over the network devices.

Conventionally, communication networks implemented based on SDN architecture provides a logically centralized control of a physically distributed control plane. Such systems implement a distributed SDN controller with the mapping between a network device, such as a switch or a router and a controller being statically configured. The terms SDN controller, network controller and controller have been used interchangeably in the specification. Statically configured controllers make it difficult for the control plane to adapt to traffic load variations in the communication networks, such as data centre networks, enterprise networks, that have significant variations in temporal traffic and spatial traffic characteristics. In such scenarios of statically configured controllers, a controller may become overloaded if the network devices mapped to this controller observe a large traffic. Further, some controllers in the communication network may be in an overload condition while other controllers may be underutilized. The load may shift across controllers over time, depending on the temporal and spatial variations in traffic conditions and static mapping can result in non-optimal performance.

Majority of the techniques follow a centralized control plane architecture, where a central controller can decide the number of controllers required and their allocation to network devices. Also, certain conventional techniques provide distributed control plane architecture for communication networks implemented based on SDN architecture. The load in such architecture is dynamically shifted to allow the controllers to operate within a specified load restriction. As the load on the communication network changes, the load on each controller also changes and the architecture dynamically expands or shrinks the controller pool as based on the change in the network load. As load imbalance occurs, a controller with heavy network load transfers its load on to another controller with relatively less load. The algorithm and techniques underlying the architecture to provide change in control pool are generally based on the existing Open Flow standard.

However, the presently available methods and systems for distributed controller architecture, as described above, do not provide optimal solutions for controller placement. Further, such methods and systems provide for addition and deletion of controllers based on the load of the communication network, but the number of the controllers in the network may not be optimum. If the non-optimum number of controllers in the communication network is high, it may lead to underutilization of some controllers and further result in delay in the control resolution, result in more electricity consumption, and cause high operational expenditure and capital expenditures for the communication network. On the other hand, if the number of controllers in the communication network is low, it may result in poor Quality-of-Service (QoS) of the communication network due to packet drops and delayed resolution of flows. Moreover, the decision of addition and deletion of network controllers based on the load of the communication network is taken by a centralized control entity. More often than not, a malfunctioning of the centralized control entity results in failure or improper functioning of the communication network.

Further, conventionally available methods are topology specific and may not be compatible with different types of communication networks. Also, conventionally available methods are often not backward compatible making them difficult to be implemented in existing communication networks. Also, some conventionally known techniques provide solution that require incurring significant cost and expenditure of resources for their implementation.

The present subject matter describes systems and methods for control plane optimization in a communication network. In an embodiment, the systems and methods allow determination of optimum number of network controllers in the communication network. Further, according to an implementation of the present subject matter, the determined optimum number of controllers may be placed at optimal locations in the control plane of the communication network. Placement of the controllers may be defined as mapping of controller on network devices, such as network switch in order to achieve a uniform load over the network, maximum utilization of the controllers, and minimum delay of control resolution.

According to an implementation of the present subject matter, the communication network may be implemented based on SDN architecture. In one implementation, the optimum number of controller(s) is determined based on the load on the communication network. Since the load on a communication network is a function of time and changes dynamically, the number of controllers to support the load may also change dynamically. Providing optimal number of controllers may include addition or deletion of controllers dynamically. Accordingly, in one implementation of the present subject matter, network controllers may be dynamically added or deleted in the communication network, such as a SDN. Further, in one embodiment, the placement of the network controllers in the control plane may be dynamically varied.

In one embodiment of the present subject matter, the optimization of the number of the controllers and their respective placement may be determined in accordance with a non-zero sum game based network control plane optimization operation. In the non-zero sum game based network control plane optimization operation, hereinafter referred to as control plane optimization operation; each network controller in the communication network computes its self payoff value. The self payoff value is indicative of whether the controller is optimally utilized, underutilized or overutilized.

In one implementation, any controller of the communication network which is underutilized and has a capacity to take over more load, may be considered as a greedy controller. Based on the control plane optimization operation, the greedy controller may increase its utilization by sharing load of one or more neighboring controllers. However, in case the controller is significantly underutilized, it may transfer its existing load to one or more neighboring greedy controllers and enter an inactive mode. This approach not only enables equal distribution of load across the various controllers but also ensures that the controllers that have a significantly low utilization are no longer active, thus allowing optimization of the operational cost of the communication network.

In another embodiment, an over-utilized controller may off-load some of its load to one or more neighboring controllers to balance its load. For example, the load may be off-loaded to a neighboring controller that is underutilized. In one embodiment, in case the over-utilized controller is unable to off-load it load to a neighboring controller or is facing excessive load in spite of the off-loading, the over-utilized controller may generate a request for activation of an additional controller in the communication network. This, again, ensures equal distribution of load across the various controllers. Also, instances where additional controllers may have to be added in the communication network are promptly identified such that there is no loss of QoS. Activation of the additional controller only at such instances ensures optimization of the operational cost of the communication network.

The control plane optimization operation is carried out by each of the controllers in the communication network. The decision to add or delete network controllers to the communication network is not taken by a centralized control entity but is rather distributed across the various controllers of the communication network. Thus, the performance of the communication network is unaffected by any delay or failure in functioning of the centralized control entity. Further, the systems and methods for control plane optimization as described in accordance with various embodiments of the present subject matter are backward compatible and may also be implemented in legacy communication networks. Furthermore, the systems and methods for control plane optimization described herein are independent of the topology of the communication network. Additionally, the systems and methods for control plane optimization provide a scalable solution for network control plane optimization that may be implemented in any communication network irrespective of the size of the communication network or the amount of load that the communication network handles.

The following disclosure describes systems and methods for control plane optimization in a communication network. It should be noted that the description merely illustrates the principles of the present subject matter. It will thus be appreciated that those skilled in the art will be able to devise various arrangements that, although not explicitly described herein, embody the principles of the present subject matter and are included within its scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

While aspects of the described system and method can be implemented in any number of different computing systems, environments, and/or configurations, embodiments for the information extraction system are described in the context of the following system(s) and method(s).

FIG. 1 illustrates a network environment implementing a system 100 for control plane optimization in communication network 102, such as a software defined network (SDN), according to an implementation of the present subject matter. In one implementation, the communication network 102 can be a public network, including multiple computing devices 104-1, 104-2 . . . 104-N, individually and commonly referred to as computing device(s) 104 hereinafter. The computing devices 104, such as personal computers, laptops, various servers, such as blade servers, and other computing devices connected to the communication network 102 to communicate with each other. In another implementation, the communication network 102 can be a private network with a limited number of computing devices 104, such as personal computers, servers, laptops, and/or communication devices, such as PDAs, tablets, mobile phones and smart phones connected to the communication network 102 to communicate with each other.

The network environment allows the computing devices 104 to transmit and receive data to and from each other. The computing devices 104 may belong to an end user, such as an individual, a service provider, an organization or an enterprise. The network environment may be understood as a public or a private network system, implementing the system 100 for control plane optimization of the communication network 102 over which the computing devices 104 may communicate with each other.

The communication network 102 may be a wireless network, wired network, or a combination thereof. The communication network 102 can be a combination of individual networks, interconnected with each other and functioning as a single large network, for example, the Internet or an intranet. The communication network 102 may be any public or private network, including a local area network (LAN), a wide area network (WAN), the Internet, an intranet, a peer to peer network, and a virtual private network (VPN). According to an implementation of the present subject matter, the communication network 102 may be a software defined network. Further, embodiments of the present subject matter, the concepts of SDN may be extended to non-SDN networks also.

In an implementation, the communication network 102 may include a plurality of network devices 106-1, 106-2, 106-3, . . . , 106-N, individually and commonly referred to as network device(s) 106 hereinafter. The network device 106 may be any network hardware device, such as network switch, simple forwarders, routers, gateways, network bridges, and hubs for mediation of data in the communication network 102. Further, a network device 106 may be hybrid network device, such as multilayer switches, proxy servers, or firewalls. The network device 106 may be utilized for communication process through the communication network 102. The network devices 106 may communicate with other network devices 106 of the communication network 102 based on communication links 108.

The communication network 102 may further include a plurality of network controllers 110-1, 110-2, . . . , 110-N, individually and commonly referred to as controller(s) 110 hereinafter. The controller(s) 110 may be employed on a control plane of a communication network 102 and may manage the flow control of the communication network 102. The controller(s) 110 may receive data from the network devices 106 employed on a data plane of the communication network 102. Further, the controller(s) 110 may obtain a forwarding path for the requests coming from networking devices 106 and configures the networking devices 106 such that networking devices 106 may forward data to other network devices 106 or to a computing device 104-1, 104-2 . . . 104-N. The controller(s) 110 may be a virtual controller or a physical controller.

In one embodiment of the present subject matter, the system 100 determines an optimum number of controller(s) 110 for the communication network 102 based on the load on the communication network 102. In one embodiment, the system 100 performs a non-zero sum game based network control plane optimization operation, interchangeably referred to as control plane optimization operation, to determine the optimum number of controller(s) 110 for the communication network 102. The control plane optimization operation has been explained in details later in this specification.

In accordance with one implementation of the present subject matter, the system 100 includes a central optimization controller (COC) 112 in the communication network 102. In another embodiment of the present subject matter, the COC 112 may be a controller 110 of the communication network 102, assigned to work as COC 112. The COC 112 may optimize the number of controllers 110 in the communication network 102. The COC 112 may be communicatively coupled to the controllers 110 through communication link(s) 108-1, 108-2, . . . , 108-N. The COC 112 may receive requests from one or more of the ccontrollers 110 for activation or deactivation of additional controllers in the communication network 102. Based on factors, such as a current traffic profile of the controller that sends the request, the network load and quality of service parameters, the COC 112 may allow or refuse the request for activation or deactivation of virtual controllers.

Activation of an additional network controller may include addition of a virtual network controller or invoking an existing dormant physical network controller. Deactivating a network controller may include deleting a virtual controller or putting an active physical controller in a dormant mode. In one example, controllers 110 may run on virtual machines. In such a network configuration, the COC 112 may provide for logical addition and deletion of the controllers 110 in the communication network 102. Logical addition and deletion of controllers 110 may be achieved through the virtual machines running the controllers 110. For instance, each controller 110 runs on a separate virtual machine. The capacity of each virtual machine, such as number of cores or CPUs, memory, disk, may be assigned dynamically. In another example, where the network configuration includes physical network controllers, the physical controllers may be dynamically invoked from a dormant mode or put in a dormant mode. The dormant mode may be a sleep mode or a switch-off mode. The COC 112 may determine to put a physical network controller on either mode based on factors, such as time or traffic profile variation of the communication network 102.

To explain, the functioning of the COC 112 to optimize the number of controllers 110 in the communication network 102, the number of controllers 110 in the communication network 102 may be represented by k, wherein the value of k may vary dynamically. At any instant, the value of k controllers 110 may be within the range of k1 and k2, such that k1≤k≤k2, where k1 may be the minimum number of controller(s) 110 and k2 may be the maximum number of controllers 110 in the communication network 102. In the worst case, k1=1 and k2=M, where M may be the number of network devices 106 in the communication network 102. In one embodiment, the optimized number of controllers 110, i.e., the value of k may be determined based on non-zero sum game based control plane optimization operation and k1 and k2 may be obtained from the statistics of the network load change.

Further, based on the control plane optimization operation, the system 100 not only provides the optimum number of controller(s) 110 at a given instance of time but also indicates an optimum placement of the respective controller(s) 110 such that delay and utilization of each of the controller(s) 110 is balanced. In this context, determining the placement of a controller 110 may be understood as ascertaining a number of network devices that may be managed by the controller 110 for a given time and identification of such network devices, such that at the load between the various controllers 110 is balanced.

Placements of controllers 110 may be explained referring to FIG. 1 that depicts the controllers 110 in the communication network 102 to be communicatively coupled with at least one of the network device(s) 106 through communication links 108-1, 108-2, . . . , 108-N. Each controller 110 may run in a master-slave mode. Accordingly, the controller 110 may be master for a set of network devices 106 and may be a slave for another set of network devices 106 that may be controlled by another master controller 110. A controller 110 would be master for a network device 106, such as a switch, if the switch refers to the controller 110 for a flow table update and routing. Both master and slave controllers 110 may communicate with each other based on inter-SDN communication protocol. Further, in one embodiment of the present subject matter, the master and slave controllers 110 may be interchangeable based on the load in the communication network 102. Change in the number of controllers 110 and/or change in placement of the existing controllers 110 may result in change of state of master or slave controller 110. The control plane optimization operation to determine that change in number and placement of controller(s) may be based on optimization parameters as follows:

$$\min f(k, c),$$

$$\text{s.t.}, \Delta t_i \leq \Delta t_{th}, \forall i,$$

$$U_i \leq U_{th}, \forall i, \quad \text{Equation 1}$$

$$\min c_i,$$

$$\text{s.t.}, \Delta t_i \leq \Delta t_{th},$$

$$U_i \leq U_{th}, \quad \text{Equation 2}$$

where f is a non-linear function of the number of active controllers 110 and cost associated with the number of active controllers 110, k represents the number of active controllers 110, c represents the capital and operational expenditure associated with implementation of the communication network 102, $U_i$ represents the utilization of $i^{th}$ controller, $\Delta t_i$ represents the delay associated with $i^{th}$ controller, $\Delta t_{th}$ represents a pre-defined threshold value for delay constraint of $i^{th}$ controller, and $U_{th}$ represents a pre-defined threshold value of utilization for $i^{th}$ controller. As load on the communication network 102 varies, equation 2 may be solved such that one or more additional controllers 110 may be added or invoked to active state, or an existing controller may be deleted or put in a dormant state. Solution of equation 2 may be obtained by designing a non-zero sum game, in which each controller 110 performs the game independently and may take their decisions independently. Since the load on the network is dynamic, obtaining an optimal solution of equation 2 applicable for load conditions may not possible. Hence, use of non-zero sum game may be appropriate.

As the load on the communication network 102 changes, utilization of the controllers 110 also change. Each controller 110 performs the non-zero sum game based control plane optimization operation to maximize its utilization. Each controller 110 obtains peer information from one or more neighbouring controller 110. Further, each controller 110 computes its payload which indicates whether the controller 110 is optimally utilized, underutilized or overutilized. Based on the payload, the controllers 110 manage their load and may send controller deletion message(s), or the controller addition message(s) to the COC 112. Further, based on the payload, an overutilized controller 110 may transfer its excess load to a neighbouring greedy controller 110 while an underutilized controller 110 may take over additional load from one or more neighbouring controller 110. In this context, load of a controller 110 may be based on the number of network devices 106 that may be managed by the controller 110 at any given instance of time and the volume of traffic each of these network devices 106 may be handling. Further, any controller 110 in the communication network 102 having capacity to take more load may be considered as a greedy controller.

Figure 2:
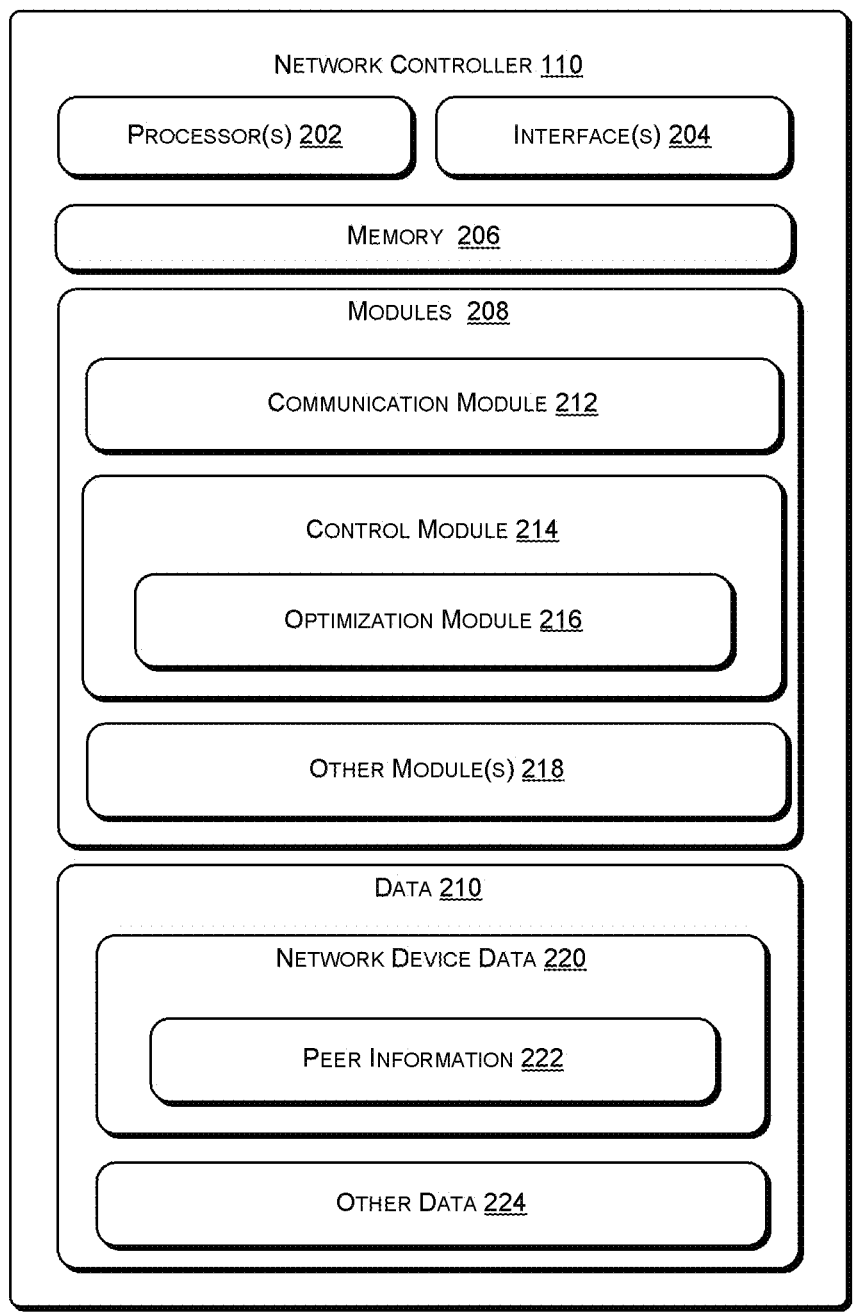
FIG. 2 illustrates a network controller, according to an implementation of the present subject matter.

FIG. 2 illustrates a network controller 110, according to an implementation of the present subject matter. According to an implementation, the controller 110 may include processor(s) 202, interface(s) 204, and memory 206 coupled to the processor(s) 202. The processor(s) 202 of the controller 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 may be configured to fetch and execute computer-readable instructions stored in the memory 206.

Further, the interface(s) 204 of the controller 110 may include a variety of software and hardware interfaces that allow the controller 110 to interact with other entities of the communication network 102, or with each other. For example, the interface(s) 204 may enable the controller 110 to communicate with network devices 106 and other devices, such as web servers and external repositories. The interface(s) 204 may also facilitate multiple communications within a wide variety of networks and protocol types, including wired networks, for example, LAN, cable, etc., and wireless networks, such as WLAN, cellular, or satellite. For the purpose, the interface(s) 204 may include one or more ports.

The memory 206 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes. Further, the controller 110 may include module(s) 208 and data 210. The module(s) 208 include, for example, a communication module 212, a control module 214, and other module(s) 218.

The data 210 may include network device data 220, and other data 224. The device data 220 may further include peer information 222. The other data 224 amongst other things, may serve as a repository for storing data that is processed, received, or generated as a result of the execution of one or more modules in the module(s) 208.

According to an implementation, the communication module 212 of the controller 110 may communicate with several network devices 106 of the communication network 102. Further, the communication module 212 may communicate with neighbouring controllers in the communication network 102. Such communication may be based on inter-SDN communication protocols. Communication of the controller 110 with neighbouring controllers 110 may include request for peer information comprising routing updates, self payoff value, or may include information messages, such as offloading message, and state change message. The communication module 212 may communicate with the module(s) 208 of the controller 110 for exchange of controller messages. In one embodiment, the communication module 212 may communicate the control messages to the neighbouring controller(s) 110 at a time instance of routing updates.

The network controller 110 includes the control module 214 to determine a traffic profile variation, compute a self payoff value, and update the routing tables. The configuration information of the controller 110, such as routing table may be stored in the network device data 220. Further, the peer information received by the communication module 212 from the neighbouring controllers 110 may be stored in the peer information 222.

In accordance with one implementation of the present subject matter, the control module 214 determines a traffic profile variation in the communication network 102. The control module 214 may receive network traffic and load information from time to time from the communication module 212. The control module 214 analyses the traffic information received at various instances of time and determines a traffic variation profile. The traffic profile variation may be indicative of changes in a current traffic profile of the controller 110 and the neighbouring controller(s) 110 with respect to a previous traffic profile.

The control module further computes a self payoff value for the controller 110. The self payoff value, also referred to as payoff, may be determined based on equation 3.

$$f_i = \lambda_i * [U_{th} - U_i] + \delta_i [\Delta t_{th} - \Delta t_{ti}], \forall i \qquad \text{Equation 3}$$

where, $f_i$ represents the self payoff value of a $i^{th}$ controller, $\lambda_i$ represents a non linear function or a constant for $i^{th}$ controller related to the usage of the controller, $U_i$ represents the utilization of $i^{th}$ controller, $U_{th}$ represents a pre-defined threshold value of utilization for $i^{th}$ controller, $\delta_i$ represents a nonlinear function or a constant for delay payoff computation for a controller i related to the delay experienced by it, $\Delta t_{th}$ represents a pre-defined threshold value for delay constraint of $i^{th}$ controller, and $\Delta t_i$ represents the delay constraint for $i^{th}$ controller. The values of $\lambda_i$, $U_i$, $U_{th}$, $\delta_i$, $\Delta_{th}$, $\Delta t_{ti}$ and the self payoff value may also be stored in the network device data 220.

In accordance with one implementation of the present subject matter, the control module 214 includes an optimization module 216 for optimization of the controller(s) 110 in the communication network 102. The optimization module 216 performs the control plane optimization operation with the neighbouring controller(s). Based on the solution achieved by performing the operation, the optimization module 216 may decide the process to be executed to achieve maximum utilization. In one example, the optimization module 216 of an overutilized controller 110 may offload several network device(s) 106 based on the solution of the control plane optimization operation. In another example, the optimization module 216 of an underutilized controller 110, may master several network device(s) 106 of the communication network 102, based on the solution of the control plane optimization operation.

In an example, based on the non-zero sum game based control plane optimization operation when the controller 110 transfers control of some of the network devices 106 that it may be managing to a neighbouring controller 110 or when the controller 110 acquires control of additional network devices 106 from one or more neighbouring controllers 110, a change in placement of the controller 110 occurs. The communication module 212 may communicate control messages to inform such change in placements or transfer of control to one or more neighbouring controllers 110. In one embodiment, the communication module 212 may also communicate the control messages to the COC 112. Also, in cases where, based on the non-zero sum game based control plane optimization operation, if a decision to activate or deactivate a controller 110 is taken, the communication module 212 may further communicate the request to the COC 112.

In one implementation of the present subject matter, the various control messages may be communicated asynchronously. In one more implementation of the present subject matter the communication module 212 communicates with the neighbouring controllers in an asynchronous manner to obtain the peer information. Such asynchronous communication wherein not all controllers 110 talk to each other at the same time ensures that, at any given instance of time, the volume of control messages being exchanged between the various controllers 110 of the communication network 102 is within acceptable limits and that the control messages do not overload the controllers 110.

Figure 3:
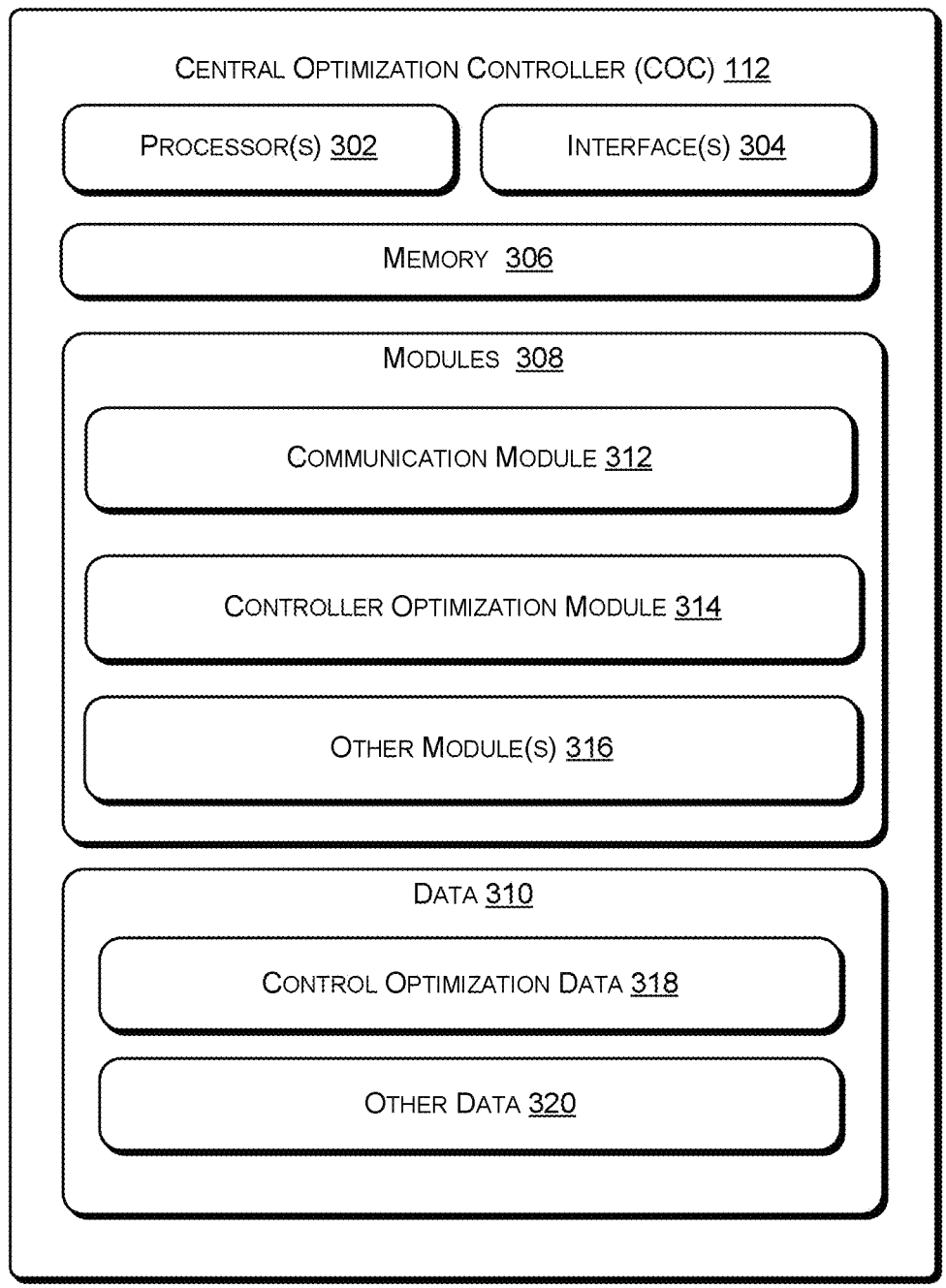
FIG. 3 illustrates a central optimization controller, according to an implementation of the present subject matter.

FIG. 3 illustrates a central optimization controller (COC) 112, according to an implementation of the present subject matter. According to an implementation, the COC 112 may include processor(s) 302, interface(s) 304, and memory 306 coupled to the processor(s) 302. The processor(s) 302 of the COC 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 may be configured to fetch and execute computer-readable instructions stored in the memory 306.

Further, the interface(s) 304 of the COC 112 may include a variety of software and hardware interfaces that allow the COC 112 to interact with other entities of the communication network 102, or with each other. For example, the interface(s) 304 may enable the COC 112 to communicate with network devices 106 and other devices, such as web servers and external repositories. The interface(s) 304 may also facilitate multiple communications within a wide variety of networks and protocol types, including wired networks, for example, LAN, cable, etc., and wireless networks, such as WLAN, cellular, or satellite. For the purpose, the interface(s) 304 may include one or more ports.

The memory 306 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes. Further, the COC 112 may include module(s) 308 and data 310. The module(s) 308 include, for example, a communication module 312, a controller optimization module 314, and other module(s) 316.

The data 310 may include controller optimization data 318, and other data 320. The other data 320 amongst other things, may serve as a repository for storing data that is processed, received, or generated as a result of the execution of one or more modules in the module(s) 308.

According to an implementation, the communication module 312 of the COC 112 may communicate with several controller(s) 110 of the communication network 102. The communication module 312 may receive request from the controllers 110 for optimization of the number of controllers 110 in the communication network 102. The request may include, request for activation of a new controller 110 in the communication network 102, or request for deactivation of an existing controller 110 from the communication network 102.

The COC 112 includes the controller optimization module 314 for execution of the request received by the communication module 312. The controller optimization module 314 may activate an additional controller in the communication network 102 or may deactivate an existing controller in the communication network 102, based on the request received. Information related to controllers 110, such as the number of controllers 110 in the communication network 102, status of controllers 110, and number of controllers 110 in 'sleep' or switched-off mode, may be stored as the controller optimization data 318.

Although in the above described embodiment, the COC 112 deactivates existing controllers based on received requests, in other embodiments, deactivation of a controller 110 in the communication network 102 may be executed by the controllers 110 themselves. For example, a controller 110 may perform the control plane optimization operation and upon determining that it is substantially underutilized, the controller 110 may execute a process to enter the inactive mode. Thus, the controller 110 may offload the associated network devices 106 and deactivates itself without intervention of the COC 112. For example, an inactive virtual network controller may be deleted while an inactive physical network controller may become dormant. Such inactive physical controllers may be considered to be in a 'dormant' mode which can be realized by either switching off the controller 110 or by keeping the controller 110 in an idle state with limited operations, such as 'sleep' mode. The controller 110 which is in 'sleep' mode can be activated and made fully operational by control message received from the COC 112 or any other controller 110. Change of state, i.e., active to inactive and vice versa may be stored in the data of the COC 112 and in the data of all neighbouring controllers 110.

Figure 4:
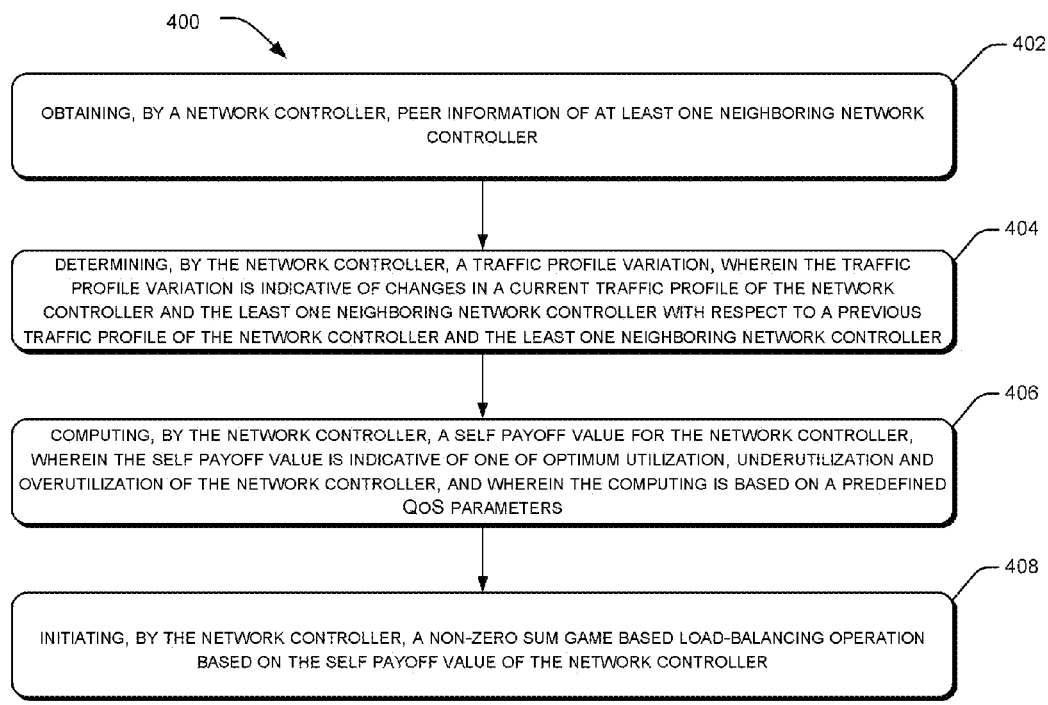
FIG. 4 illustrates a network control plane optimization method, according to an implementation of the present subject matter.

FIG. 4 illustrates a control plane optimization method, according to an implementation of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in either a local or a remote computer storage media, including memory storage devices.

The order in which the method 400 is described is not intended to be construed as a limitation, and any number of the described method blocks can be combined in any order to implement the method 400, or alternative methods. Additionally, individual blocks may be deleted from the methods without departing from the spirit and scope of the subject matter described herein. Furthermore, the method 400 can be implemented in any suitable hardware, software, firmware, or combination thereof.

Referring to FIG. 4, at block 402, the method 400 may include obtaining, by a network controller 110, peer information of at least one neighbouring network controller 110. The peer information may be indicative of utilization and delay associated with the performance of the at least one neighbouring network controller 110.

At block 404, the method 400 includes determining a traffic profile variation by the network controller 110. The traffic profile variation may be indicative of changes in a current traffic profile of the network controller 110 and the least one neighbouring network controller 110 with respect to a previous traffic profile of the network controller 110 and the least one neighbouring network controller 110.

At block 406, the method 400 includes computing a self payoff value for the network controller 110, by the network controller 110. The self payoff value may be indicative of one of optimum utilization, underutilization and overutilization of the network controller 110. Further, as explained previously, the computing of self payoff value may be based on predefined QoS parameters, which may include parameters, such as maximum and minimum utilization threshold values.

At block 408, the method 400 includes initiating a non-zero sum game based control plane optimization operation based on the self payoff value, by the network controller 110 and neighbour's payoff values. The non-zero sum game based control plane optimization operation provides for optimizing the number and placement of controllers 110 in the communication network. The control plane optimization operation may include one of activating of at least one additional network controller 110, transferring control of one or more network devices 106 managed by the network controller 110 to a neighbouring network controller 110, deactivating the network controller 110, and transferring control of one or more additional network devices 106 to the network controller 110.

Figure 5A:
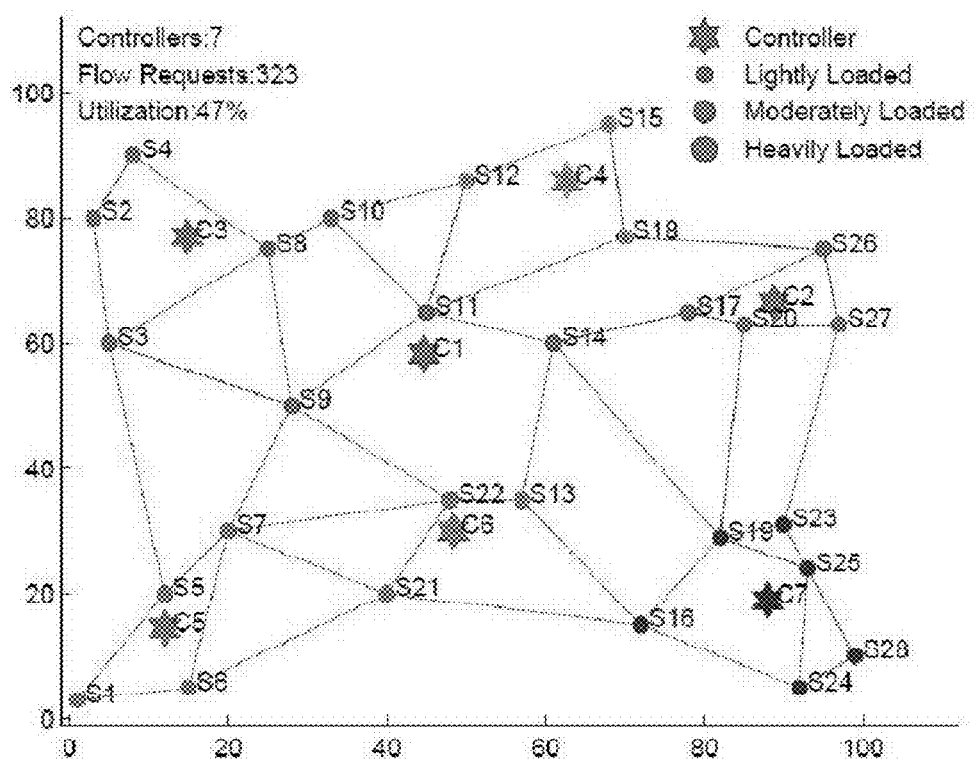
FIG. 5($a$) illustrates an SDN topology implementing the non-zero sum game based network control plane optimization operation, according to an implementation of the present subject matter.

FIG. 5(a) illustrates an SDN topology implementing the non-zero sum game based control plane optimization operation, according to an implementation of the present subject matter. The figure illustrates the SDN topology with 7 active controllers 110 (C1, C2, . . . , C7) in the communication network 102 represented by a 'star'. The figure further illustrates 28 network devices 106 represented by 'circles'. For the ease of explanation, the network devices 106 may be assumed to be switches (S1, S2, . . . , S28). The switches may be categorized in three categories based on the loads, such as lightly loaded, moderately loaded, and heavily loaded. In the example illustrated in the figure, the switches are uniformly loaded. Further, the figure illustrates communication links 108 for sharing of information amongst switches. According to the example illustrated in the figure, 323 flow requests may be severed by the 7 active controllers 110 and 47% utilization of the controllers 110 may be achieved in the illustrated example. In accordance with one embodiment of the present subject matter, the configuration of the communication network 102 may be modified, i.e., the number of placement of the controllers 110 may be changed to achieve improved utilization of the controllers 110. In one example, the SDN topology as depicted in FIG. 5(a) may be modified to the SDN topology as depicted in FIG. 5(b) to achieve improved utilization of the controllers 110 since 47% utilization of the controllers 110 as depicted in the example of FIG. 5(a) may be considered low.

Figure 5B:
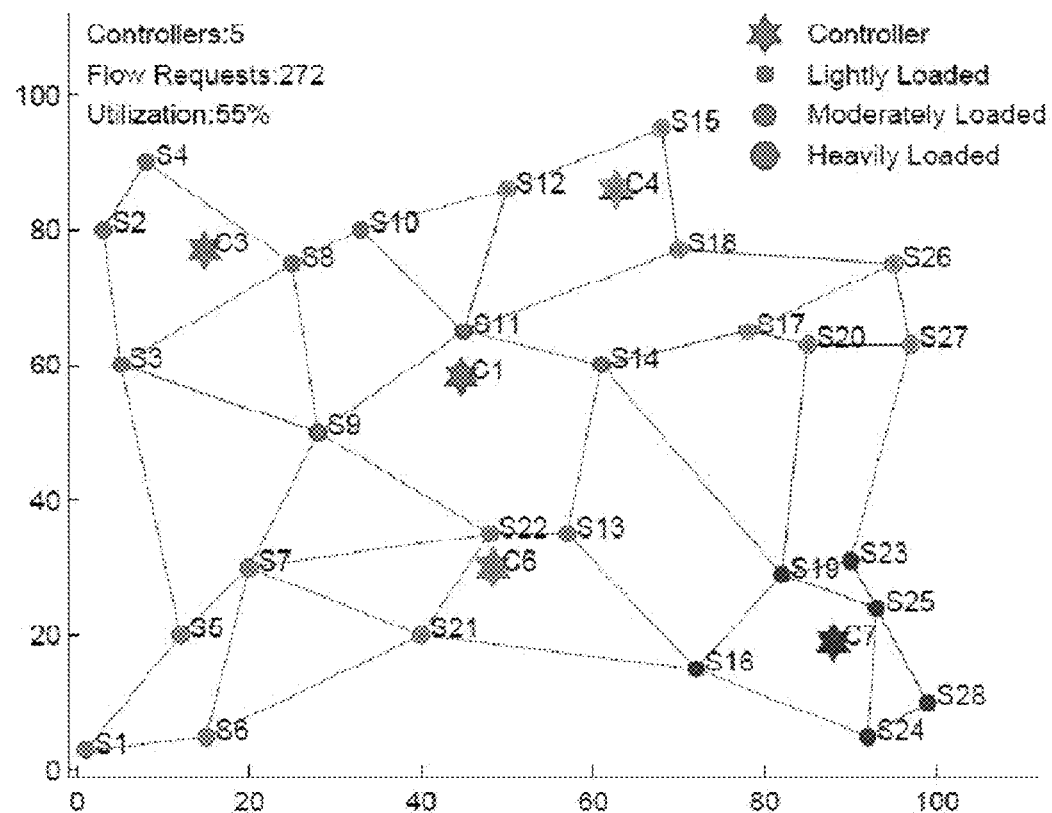

FIG. 5(b) illustrates an SDN topology implementing the non-zero sum game based control plane optimization operation for a decreasing load, according to an implementation of the present subject matter. The network topology illustrates the same topology as of FIG. 5(a), with same number of network devices as 28 switches but with lesser number of flow requests. The topology serves 272 flow requests with 5 active controllers and achieving a utilization of 55%.

According to an implementation of the present subject matter, each controller 110 as illustrated in the FIGS. 5(a) and 5(b) computes a self payoff value and runs the load-optimization process at several instances of time to achieve maximum utilization. For example, controller C4 may obtain peer information of neighbouring controllers C1, C2, and C3 and information of switches of such controllers. The controller C4 determines the change in the traffic profile based on the current traffic profile and previously received traffic profile. In such situation, where the number of flow requests decreases, the controller performs the control plane optimization operation to maximize utilization. Hence, the controller C4 compares its self payoff value with the minimum threshold payoff value and maximum threshold payoff value to determine underutilization or overutilization of the controller. Based on the information about utilization of the controller, each controller performs the control plane optimization operation along with one or more neighbouring controllers.

In the illustrated example, the process of performing the control plane optimization operation by each of the controllers in the network results in increased utilization by deletion of 2 controllers C2, and C5. The switches mastered by controllers C2 and C5 may be offloaded to other active controllers before deletion. For example, the switches S17, S18, S26, and S27 originally mastered by controller C2, may be mastered by controller C4 on deletion of controller C2. Thus, controller C4 originally mastering 3 switches, may master 7 switches. Similarly, the controller C5 may be deleted for achieving maximum utilization of controllers. The switches S1, S5, S6, and S7 originally mastered by controller C5 may be mastered by controller C6 on deletion of controller C5. Thus, the controller C6 originally mastering 3 switches may master 7 switches. In the above described example, decision of deletion of controllers results an increase in utilization of controllers. The utilization of 47%, as illustrated in FIG. 5(a) increases to 55% on deletion of two controllers, as illustrated in FIG. 5(b). Such decision of deletion of controllers further results in decrease of operational expenditure of the communication network 102. Optimization of number of controllers for a changing network traffic is further illustrated based on FIGS. 6(a), 6(b), 7(a), and 7(b)

Figure 6A:
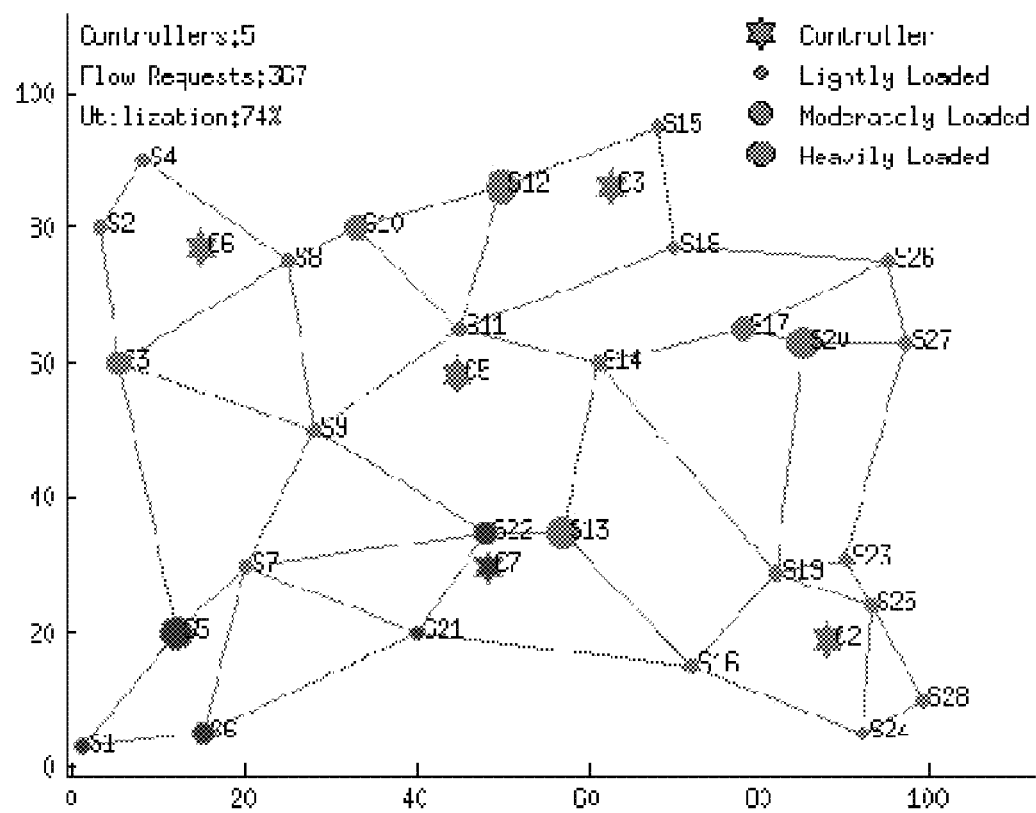
FIG. 6($a$) illustrates an SDN topology implementing the non-zero sum game based network control plane optimization operation, according to an implementation of the present subject matter.

FIG. 6(a) illustrates an SDN topology implementing the non-zero sum game based control plane optimization operation, according to an implementation of the present subject matter. The figure illustrates a SDN topology with 5 active controllers (C2, C3, C5, C6, and C7) in the network represented by a 'star'. The figure further illustrates 28 network devices 106 represented by 'circles'. The network devices 106 may be assumed to be switches (S1, S2 . . . S28). The switches may be categorized in three categories based on the loads, such as lightly loaded, moderately loaded, and heavily loaded. Such categories may be represented virtually based on the size of the circle in the figure. Lightly loaded switches may be represented by a circle with a small diameter; moderately loaded switches may be represented by a circle of diameter larger than the diameter of the lightly loaded switch; while the heavily loaded switch may be represented by a circle of largest diameter among the circles of three categories of switch loads. Further, the figure illustrates communication links 108 for sharing of information amongst switches.

According to the example illustrated in the figure, 367 flow requests may be served by the 5 active controllers and 74% utilization of the controllers may be achieved in the illustrated example. The figure further illustrates non-uniform distribution of load over the switches. In accordance with one embodiment of the present subject matter, the configuration of the communication network may be modified, i.e., the number of controllers and mapping of the controllers to the switches may be changed to achieve optimum utilization of the controllers based on the network load. In one example, the SDN topology as depicted in FIG. 6(a) may be modified to the SDN topology as depicted in FIG. 6(b) to achieve optimum utilization of the controllers.

Figure 6B:
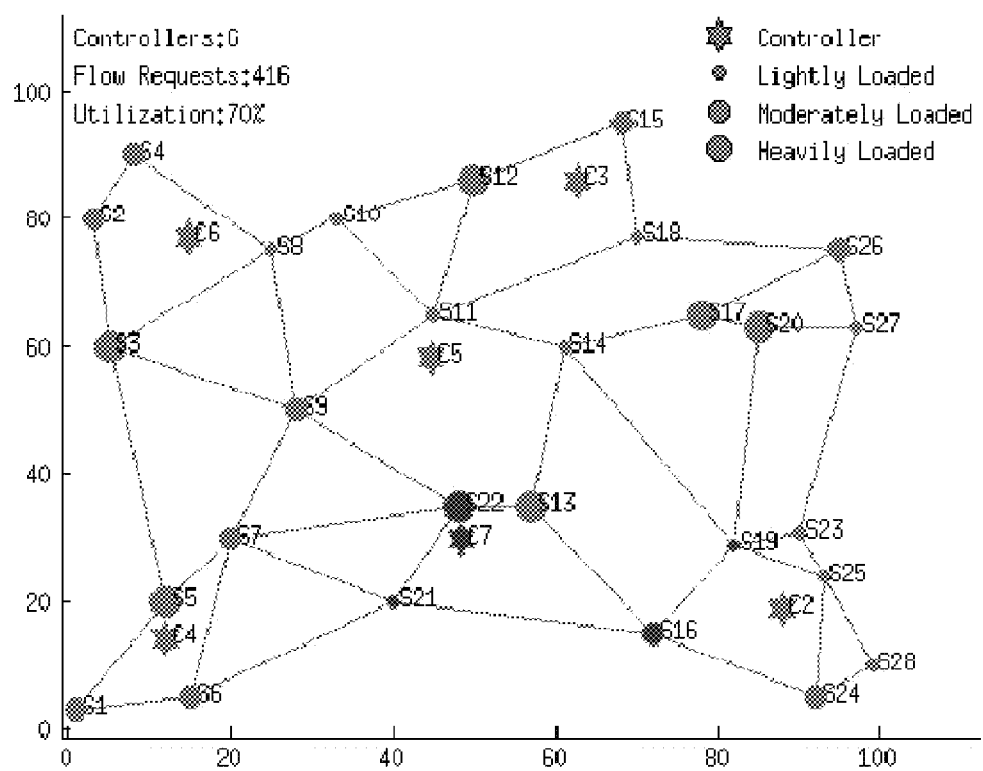

FIG. 6(b) illustrates an SDN topology implementing the non-zero sum game based control plane optimization operation for an increasing network load, according to an implementation of the present subject matter. The network topology illustrates a similar topology as of FIG. 6(a), with same number of network devices as 28 switches but with increased number of flow requests as 416. The topology serves 416 flow requests with 6 active controllers and achieving a utilization of 70%.

According to the illustrated example, on an increase in the number of flow requests, the load on the switches S1, S2, S3, S4, S7, S9, S15, S16, S17, S22, and S24 increases, the load on S10 decreases, while the load on other switches does not change. The network load on switches causes an imbalance of the load distribution on the 5 active controllers as depicted in FIG. 6(a). As the traffic profile of the controllers change, each controller performs the control plane optimization operation to optimize the load. Based on the solutions of the control plane optimization operation performed by the controllers, a message for activation of an additional controller may be sent to the COC 112. The COC 112 activates the additional controller C4 in the network. The controllers, based on the results of the control plane optimization operation reallocate the switches mastered by each controller. Thus, the new controller C4 masters switches S1, S5, and S6 offloaded by controller C7. Since the total load on the controller C7 reduces on offloading of switches to C4, the controller C7 performs the control plane optimization operation with C2 and masters switches S16 and S19. Further, as the controller C2 also performs the control plane optimization operation with its neighbouring controllers, controller C2 masters switch S27 offloaded by controller C3. Thus, as illustrated in the example, an increase in the number of flow requests may be served by increasing the number of controllers in the communication network.

Figure 7A:
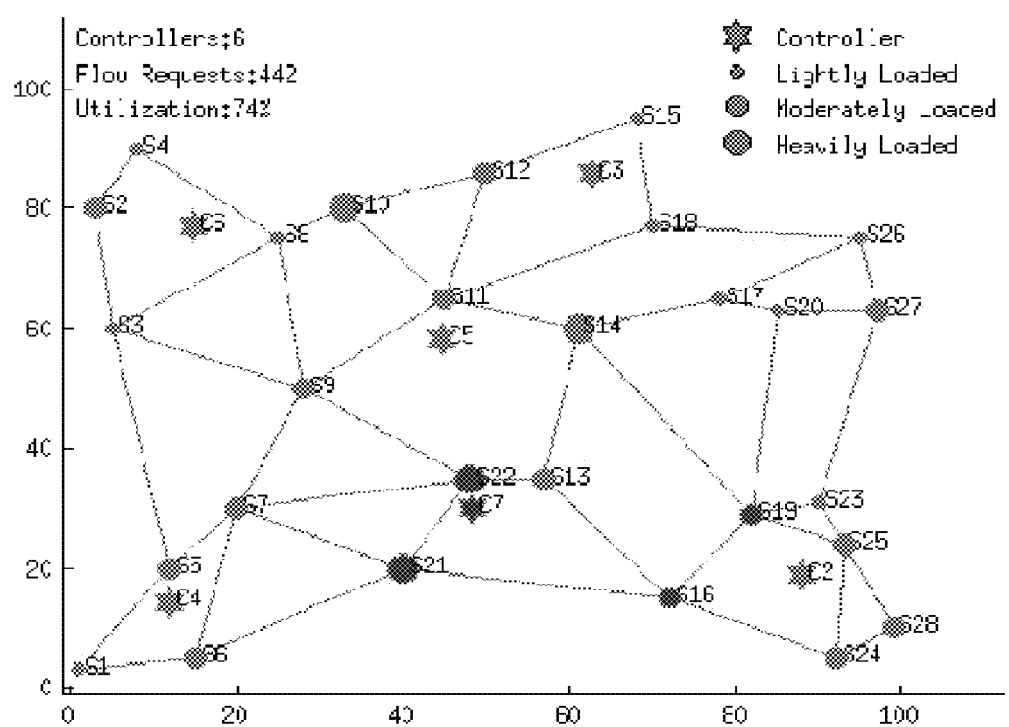
FIG. 7($a$) illustrates an SDN topology implementing the non-zero sum game based network control plane optimization operation, according to an implementation of the present subject matter.

FIG. 7(a) illustrates an SDN topology implementing the non-zero sum game based control plane optimization operation, according to an implementation of the present subject matter. The figure illustrates a SDN topology with 6 active controllers (C2, C3, . . . , C7) in the communication network represented by a 'star'. The figure further illustrates 28 network devices represented by 'circles'. The network devices 106 may be assumed to be switches (S1, S2, . . . , S28). The switches may be categorized in three categories based on the loads, such as lightly loaded, moderately loaded, and heavily loaded. Such categories may be represented virtually based on the size of the circle in the figure. Lightly loaded switches may be represented by a circle with a small diameter; moderately loaded switches may be represented by a circle of diameter larger than the diameter of the lightly loaded switch; while the heavily loaded switch may be represented by a circle of largest diameter among the circles of three categories of switch loads. Further, the figure illustrates communication links 108 for sharing of information amongst switches.

According to the example illustrated in the figure, 442 flow requests may be severed by the 6 active controllers and 74% utilization of the controllers may be achieved in the illustrated example. The figure further illustrates non-uniform distribution of load over the switches. In accordance with one embodiment of the present subject matter, the configuration of the communication network 102 may be modified, i.e., the number of controllers and the mapping of the controllers to the switches may be changed to achieve optimum utilization of the controllers based on the network load. In one example, the SDN topology as depicted in FIG. 7(a) may be modified to the SDN topology as depicted in FIG. 7(b) to achieve optimum utilization of the controllers.

Figure 7B:
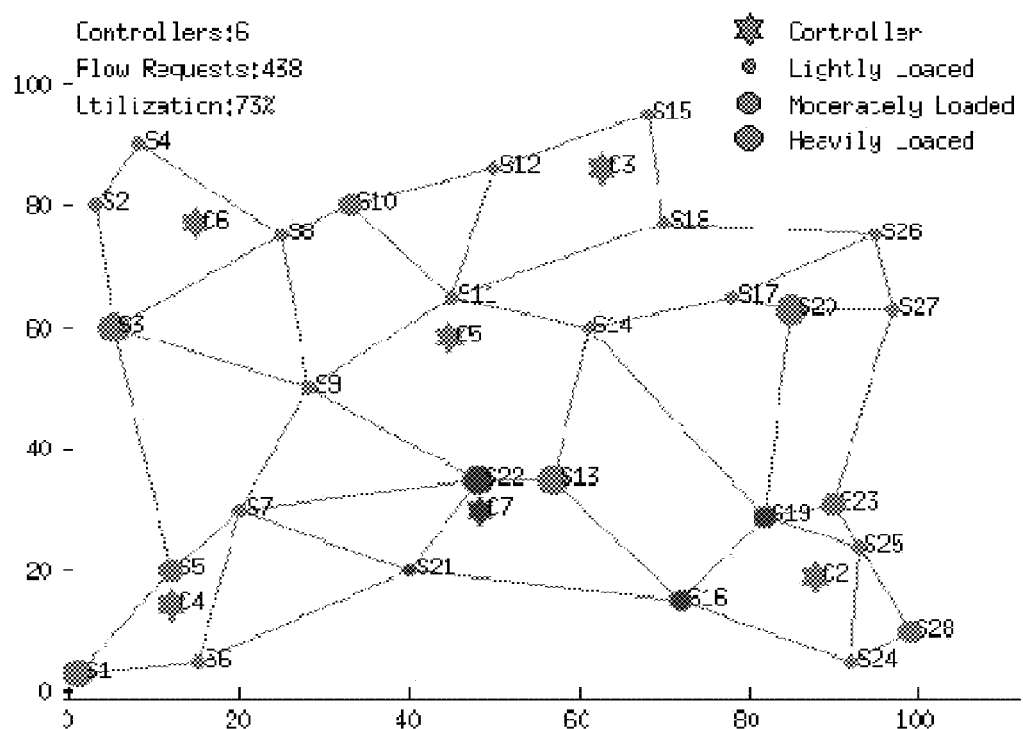

FIG. 7(b) illustrates an SDN topology implementing the non-zero sum game based control plane optimization operation for a change in network load, according to an implementation of the present subject matter. The network topology illustrates a similar topology as of FIG. 7(a), with same number of network devices as 28 switches but with decreased number of flow requests as 438. The topology serves 438 flow requests with 6 active controllers and achieving a utilization of 73%.

According to the illustrated example, on a decrease in the number of flow requests, the load on the switches S1, S3, S6, S13, S20, and S23 increases, load on switches S2, S7, S9, S10, S11 S12, S14, S21, S24, S25, and S27 decreases, while the load on the other switches does not change. The network load on switches causes an imbalance of the load distribution on the 6 active controllers as depicted in FIG. 7(a). As the traffic profile for the controllers change, each controller performs the control plane optimization operation to optimize the load. As illustrated, since the decrease in the number of flow requests is small, deactivation of a controller may not provide an optimized solution. Thus, based on the results of the control plane optimization operation performed by the controllers, the controllers reallocate the switches to optimize the load distribution. Switches S7 and S9 are mastered by controller C5 on offloading by controller C4, based on the control plane optimization operation performed by controller C4 with controller C5. Thus, as illustrated in the example, a decrease in the number of flow requests is optimized based on control plane optimization operation to achieve optimum utilization of the controllers.

Although embodiments for methods and systems for controller optimization in communication networks have been described in a language specific to structural features and/or methods, it is to be understood that the invention is not necessarily limited to the specific features or methods described. Rather, the specific features and methods are disclosed as exemplary embodiments for load optimization in software defined networks.

We claim:

1. A method for optimization of a control plane comprising network controllers in a communication network, the method comprising:

obtaining, by a network controller, peer information of at least one neighbouring network controller, wherein the peer information is indicative of utilization and delay associated with performance of the at least one neighbouring network controller;

determining, by the network controller, a traffic profile variation, wherein the traffic profile variation is indicative of changes in a current traffic profile of the network controller and the at least one neighbouring network controller with respect to a previous traffic profile of the network controller and the at least one neighbouring network controller;

computing, by the network controller, a self payoff value for the network controller, wherein the self payoff value is indicative of one of optimum utilization, underutilization and overutilization of the network controller, and wherein the computing is based on predefined QoS parameters; and initiating, by the network controller, a non-zero sum game based network control plane optimization operation based on the self payoff value and the traffic profile of at least one neighbouring network controller, wherein the non-zero sum game based network control plane optimization operation comprises one of:

activating at least one additional network controller, transferring control of one or more network devices managed by the network controller to the at least one neighbouring network controller, deactivating the network controller, and transferring control of one or more network devices managed by the at least one neighbouring network controller to the network controller.

2. The method as claimed in claim 1, wherein, for the self payoff value indicative of overutilization of the network controller, the non-zero sum game based network control plane optimization operation comprises:

generating a request for activation of the at least one additional network controller;

receiving an indication of activation of the at least one additional network controller;

transferring control of one or more network devices managed by the network controller to the at least one additional network controller; and generating a control message to inform the transferring to the at least one neighbouring network controller.

3. The method as claimed in claim 2, wherein the activation of the at least one additional network controller comprises one of adding a virtual network controller and invoking a dormant physical network controller.

4. The method as claimed in claim 1, wherein, for the self payoff value indicative of overutilization of the network controller, the non-zero sum game based network control plane optimization operation comprises:

identifying a greedy controller from amongst at least one neighbouring network controller, to undertake more load;

requesting the greedy controller to accept control of one or more network devices managed by the network controller;

receiving a response from the greedy controller;

transferring control of one or more network devices managed by the network controller to the greedy controller based on the response; and generating a control message to inform the transferring to the at least one neighbouring network controller.

5. The method as claimed in claim 1, wherein, for the self payoff value indicative of underutilization of the network controller, the non-zero sum game based network control plane optimization operation, comprises deactivating the network controller.

6. The method as claimed in claim 5, wherein the deactivating comprises one of deleting a virtual network controller and putting a active physical network controller in a dormant mode, and wherein putting the active physical network controller in the dormant mode further comprises one of switching off the network controller and putting the active physical network controller in a sleep mode.

7. The method as claimed in claim 1, wherein, for the self payoff value indicative of underutilization of the network controller, the non-zero sum game based network control plane optimization operation comprises:

identifying a greedy controller from amongst at least one neighbouring network controller, to undertake more load;

off-loading control of one or more network devices managed by the network controller to the greedy controller;

generating a control message to inform the off-loading to the at least one neighbouring network controller; and initiating a dormant mode for the network controller.

8. A network controller comprising:

a processor;

a communication module coupled to the processor to obtain peer information of at least one neighbouring network controller, wherein the peer information is indicative of utilization and delay associated with performance of the at least one neighbouring network controller;

a control module coupled to the processor to:

determine a traffic profile variation, wherein the traffic profile variation is indicative of changes in a current traffic profile of the network controller and the at least one neighbouring network controller with respect to a previous traffic profile of the network controller and the at least one neighbouring network controller; compute a self payoff value for the network controller, wherein the self payoff value is indicative of one of optimum utilization, underutilization and overutilization of the network controller, and wherein the computing is based on a predefined QoS parameters; and initiating a non-zero sum game based network control plane optimization operation based on the self payoff value and the traffic profile of the at least one neighbouring network controller, wherein the non-zero sum game based network control plane optimization operation comprises one of:

activating at least one additional network controller, transferring control of one or more network devices managed by the network controller to the at least one neighbouring network controller, deactivating the network controller, and transferring control of one or more network devices managed by the at least one neighbouring network controllers to the network controller.

9. The network controller as claimed in claim 8, wherein the communication module communicates control messages to the at least one neighbouring network controller, wherein the control messages are indicative of activation of the at least one additional network controller, transfer of control of the one or more network devices managed by the network controller to the at least one neighbouring network controller, deactivation of the network controller, and transfer of control of the one or more network devices managed by the at least one neighbouring network controllers to the network controller.

10. The network controller as claimed in claim 9, wherein the communication module obtains peer information of the at least one neighbouring network controller and communicates the control messages to the at least one neighbouring network controller asynchronously.

11. The network controller as claimed in claim 10, wherein the communication module communicates the control messages to the at least one neighbouring network controller at a time instance of routing updates.

12. The network controller as claimed in claim 8, wherein the communication module sends a request to a central optimization controller for one of activating the at least one additional network controller and deactivating the network controller.

13. The network controller as claimed in claim 8, wherein the control module updates the routing table of the network controller.

14. The network controller as claimed in claim 8, wherein the QoS parameters comprise maximum utilization threshold value of the network controller, minimum utilization threshold value of the network controller, and minimum delay of the control resolution.

15. A central optimization controller comprising:

a processor;

a communication module coupled to the processor to receive a request, from a network controller, for activating at least one additional network controller in a communication network; and a controller optimization module coupled to the processor to activate the least one additional network controller in response to the request based on a current traffic profile of the network controller, the current traffic profile being indicative of a utilization and delay associated with performance of the network controller.

* * * * *